United States Patent
Kärnä et al.

(10) Patent No.: US 6,625,138 B2
(45) Date of Patent: *Sep. 23, 2003

(54) DATA TRANSMISSION METHOD AND A RADIO SYSTEM

(75) Inventors: Juha Kärnä, Espoo (FI); Antti Toskala, Helsinki (FI); Pekka Soininen, Helsinki (FI); Kari Kalliojärvi, Veikkola (FI); Ari Hottinen, Espoo (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/974,325

(22) Filed: Oct. 9, 2001

(65) Prior Publication Data

US 2002/0114297 A1 Aug. 22, 2002

Related U.S. Application Data

(63) Continuation of application No. 09/407,568, filed on Sep. 28, 1999, and a continuation of application No. PCT/FI99/00107, filed on Feb. 11, 1999.

(30) Foreign Application Priority Data

Feb. 12, 1998 (FI) .................................................. 980321

(51) Int. Cl.[7] .......................... H04B 7/216; H04B 7/00; H04Q 7/20
(52) U.S. Cl. ....................................... 370/342; 455/522
(58) Field of Search ................................ 370/310, 315, 370/319–320, 335, 342, 441, 443, 464, 479, 328–329; 375/130, 134–135, 137, 142, 144, 145, 148–150; 455/522, 69–70

(56) References Cited

U.S. PATENT DOCUMENTS 5,022,046 A 6/1991 Morrow ...................... 375/130
5,363,403 A 11/1994 Schilling et al. ............ 370/441

(List continued on next page.)

FOREIGN PATENT DOCUMENTS

| WO | 98/18280 | 4/1998 |
| WO | 98/49857 | 11/1998 |

OTHER PUBLICATIONS

"A New Slotted ALOHA Based Random Access Method for CDMA Systems", R. Esmailzadeh & M. Gustafsson, IEEE Proceedings, International Conference on Universal Personal Communications, Oct. 1997.

Primary Examiner—Seema S. Rao
Assistant Examiner—Kevin C. Harper
(74) Attorney, Agent, or Firm—Squire, Sanders & Dempsey L.L.P.

(57) ABSTRACT

The invention relates to a data transmission method used in a CDMA-type radio system. A base station and terminal equipments exchange data at least in a packet switched mode, and a terminal equipment transmits to the base station on a random access channel a random access signal comprising at least a preamble (100) and a data part (102) multiplied by a spreading code. A predetermined set of spreading codes and signature sequences (104) are stored in the terminal equipment, and each signature sequence (104) determines one spreading code. The terminal equipment selects one signature sequence (104) by a random process from the set of signature sequences and adds the selected signature sequence (104) to the preamble (100) of the random access signal. Further, the terminal equipment uses the spreading code corresponding to the selected signature sequence (104) in the data part (102) of the random access signal. Interference cancellation is performed at the base station according to the signature sequence (104) of the preamble (100) of the received random access signal, such that at least the interference caused by the received data part (102) is eliminated from at least one other received signal in order to improve detection.

5 Claims, 4 Drawing Sheets

U.S. PATENT DOCUMENTS

| | | | |
|---|---|---|---|
| 5,546,424 A | | 8/1996 | Miyake ........................ 375/141 |
| 5,553,062 A | * | 9/1996 | Schilling et al. ............. 370/479 |
| 5,581,547 A | * | 12/1996 | Umeda et al. ............... 370/342 |
| 5,673,259 A | | 9/1997 | Quick ......................... 370/342 |
| 5,822,359 A | | 10/1998 | Bruckert et al. ............. 375/145 |
| 5,862,132 A | | 1/1999 | Blanchard et al. ........... 370/342 |
| 5,898,740 A | * | 4/1999 | Laakso et al. ............... 375/346 |
| 6,028,851 A | * | 2/2000 | Persson et al. .............. 370/329 |
| 6,163,533 A | * | 12/2000 | Esmailzadeh et al. ....... 370/342 |
| 6,167,056 A | | 12/2000 | Miller et al. ................. 370/441 |
| 6,259,724 B1 | * | 7/2001 | Esmailzadeh ............... 375/143 |
| 6,292,471 B1 | * | 9/2001 | Cao et al. .................... 370/252 |
| 6,381,229 B1 | * | 4/2002 | Narvinger et al. ........... 370/328 |
| 2001/0019548 A1 | | 9/2001 | Schilling et al. ............. 370/335 |
| 2001/0021195 A1 | * | 9/2001 | Miller et al. ................. 370/441 |

\* cited by examiner

DATA TRANSMISSION METHOD AND A RADIO SYSTEM

This application is a continuation of Ser. No. 09/407,568 filed Sep. 28, 1999, and a continuation of application Ser. No. PCT/FI99/00107, filed Feb. 11, 1999. The application is incorporated herein by reference.

FIELD OF THE INVENTION

The invention relates to a data transmission method used in a CDMA-type radio system comprising at least one base station and a plurality of terminal equipments that exchange data at least in a packet switched mode, a terminal equipment transmitting to the base station on a random access channel a random access signal comprising at least a preamble and a data part multiplied by a spreading code.

The invention also relates to a radio system that is of the CDMA type and that comprises at least one base station and a plurality of terminal equipments which are arranged to exchange data at least in a packet switched mode, a terminal equipment being arranged to transmit to the base station on a random access channel a random access signal that comprises at least a preamble and a data part multiplied by a spreading code.

BACKGROUND OF THE INVENTION

At present, packet switched networks are a particular object of interest in further development of code division multiple access (CDMA) and wideband CDMA (W-CDMA) systems. Especially third-generation mobile systems, such as the universal mobile telephone system (UMTS), are being provided with arrangements enabling packet transmission.

Packet switching is a method where a connection is set up between users by transferring data in packets that contain address and control data in addition to the actual data. Several connections may employ the same transmission channel simultaneously. The packet switching method is suitable for data transmission where the data to be transmitted is generated in bursts. In such a case, it is not necessary to allocate a data link for the entire duration of transmission but only for the time it take to transmit the packets. This reduces costs and saves capacity considerably during both the set-up and use of the network. In order for data transmission to be sufficiently fast, applications utilizing packet switching require high reliability of transmission for example in order to avoid retransmissions.

The problem with packet switched transmission in the uplink direction in CDMA systems is how to implement sufficiently fast synchronization for bursts while keeping the interference caused by the transmission to other users as small as possible. Fast synchronization is only possible if the transmission power of the bursts is high enough. The transmission power in turn affects directly the interference caused to other users. In prior art arrangements, there have been efforts to solve these problems such that a terminal equipment keeps transmitting a preamble of a random access signal with a gradually increasing power until the base station sends an acknowledgement of synchronization with the signal transmitted by the terminal equipment. The terminal equipment then fixes the power of the random access signal at the level it had during the acknowledgement. This arrangement has an advantage that the transmission power is as low as possible. A drawback is that the synchronization is slow, wherefore the total transfer rate remains small. In another prior art arrangement the aim is to immediately determine the correct transmission power for a burst by estimating the transmission power by means of open loop power control. This takes place by utilizing measurements in the downlink direction and the data transmitted by the base station about for example the interference level of the combined signal it has received. In order to reduce the likelihood of simultaneous transmissions with the same code, the terminal equipment selects the moment of burst transmission and the spreading code it uses randomly from a set of alternatives. *A New Slotted ALOHA Based Random Access Method for CDMA Systems* by R. Esmailzadeh, M. Gustafsson (IEEE Proceedings, International Conference on Universal Personal Communications, October 1997), which is incorporated herein by reference, discloses an arrangement for improving data transfer rate in packet switched communication. The method comprises two steps: the terminal equipment transmits a packet switched random access signal for call set-up in a certain time slot, and the base station correspondingly accepts the request of the random access signal if the signal received by the base station is error-free. Before the terminal equipment transmits the random access signal, it estimates the transmission power required. However, this arrangement does not solve the problem of interference caused to other users. Also, the terminal equipment must estimate the transmission power in the downlink direction, even though it transmits itself in the uplink direction where the radio channel is usually totally different and therefore the risk of selecting a wrong transmission power is great.

BRIEF DESCRIPTION OF THE INVENTION

The object of the invention is to realize a method and a radio system implementing the method which solve the aforementioned problems while providing rapid synchronization, decreasing the amount of interference and increasing the data transmission capacity.

This is achieved with a data transmission method of the type described in the preamble that is characterized in that a predetermined set of spreading codes and signature sequences are stored at the terminal equipment or the equipment generates such a predetermined set of spreading codes and signature sequences, and each signature sequence determines one spreading code; the terminal equipment selects one signature sequence by a random process from the set of signature sequences and adds the selected signature sequence to the preamble of the random access signal; the terminal equipment uses the spreading code corresponding to the selected signature sequence in the data part of the random access signal; interference cancellation is performed at the base station according to the signature sequence of the preamble of the received random access signal, such that at least the interference caused by the received data part is eliminated from at least one other received signal in order to increase data transmission capacity and to improve detection.

The radio system according to the invention is also characterized in that the terminal equipment comprises signature sequence means and spreading code means that are arranged to provide a predetermined set of spreading codes and signature sequences, each signature sequence determining one spreading code; the terminal equipment is arranged to select one signature sequence by a random process from the set of signature sequences, and to add the selected signature sequence to the preamble of the random access signal; the terminal equipment is arranged to use the spreading code corresponding to the selected signature sequence in the data part of the random access signal; the base station is arranged to perform interference cancellation according to the signature sequence of the preamble of the received random access signal, such that the base station is arranged to eliminate at least the interference caused by the received data part from at least one other received signal in order to increase transmission capacity and to improve detection.

The data transmission method and the radio system according to the invention provide several advantages. The arrangement according to the invention provides faster synchronization and a greater data transfer rate for each packet switched channel than the prior art solutions, without impairing the signal-to-interference ratio of the other channels.

BRIEF DESCRIPTION OF THE FIGURES

The invention will be described below in more detail by means of preferred embodiments and with reference to the accompanying drawings, in which.

DETAILED DESCRIPTION OF THE INVENTION

The arrangement according to the invention is particularly suitable for CDMA radio systems where signals are transmitted in a packet switched mode. The access channel typically used for call set-up in a CDMA cellular radio system is a random access channel RACH, which is a channel of a subscriber terminal and which is selected from all the possible access channels, and the subscriber terminal selects the phase of the pseudonoise code from all the available phases. When terminal equipments wish to set up a radio link, they transmit a call set-up message on the access channel to the base station that forwards it to the system where traffic channel resources are allocated to the link. When the base station wants to set up a traffic channel connection, it transmits a call on a paging channel to the terminal equipment, which responds to the call by requesting for a traffic channel via the access channel.

Figure 1A:
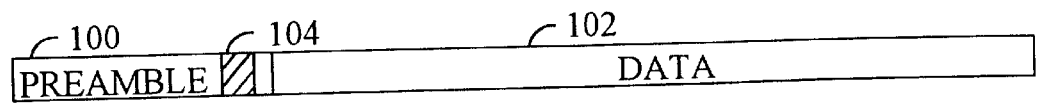
FIG. 1a shows a random access burst.

A random access burst is shown in FIG. 1a. A random access burst typically comprises two parts: a preamble 100 and a data part 102. The preamble 100 has a duration of for example 1 ms and it typically comprises 16 symbols, each of which is multiplied by a spreading code of 256 chips. The preamble 100 usually contains address and control data. The data part 102 comprises a data packet transmitted by a terminal equipment. Instead of the successive transmission shown in FIG. 1, the preamble 100 and the data part 102 can be transmitted in parallel so that they are substantially simultaneous. In the arrangement according to the invention, the preamble 100 contains data about the spreading code of the data part 102. The data about the used spreading code of the data part 102 may be located in the preamble 100 in two different manners. One way is to provide the preamble 100 with a symbol-level signature sequence 104 which determines the spreading code. Another alternative is not to use a symbol-level signature sequence, but the spreading code of the preamble 100 is itself a signature sequence that determines the spreading code of the data part 102. In a special, simplified arrangement according to the invention, the number of the signature sequences 104 is one, in other words the set of signature sequences comprises only one sequence element. The preamble 100 thus comprises known reference symbols that are used for establishing synchronization and for forming a channel estimate, and the spreading code of the data part 102 is known. The spreading factor of the data part 102 may also be known or it can be estimated with known methods, such as error check of the detected data part 102. Since in this arrangement the packets have the same preamble 100, the chances of receiving almost simultaneously transmitted packets are smaller.

Figure 1B:
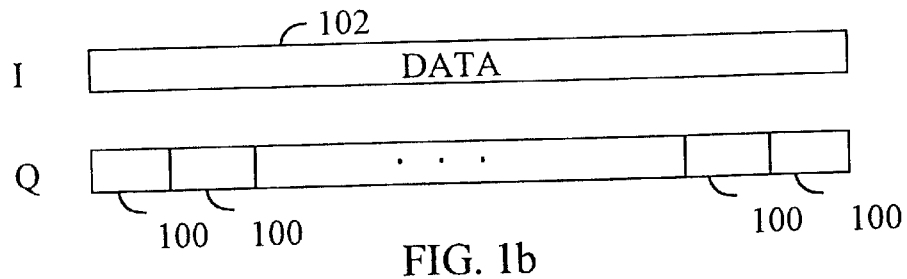
FIG. 1b shows a random access burst where the preamble and the data part are transmitted simultaneously.

FIG. 1b illustrates the possibility that the preamble 100 can be transmitted substantially simultaneously with the data part 102. Since the preamble 100 is typically shorter than the data part 102, the preamble 100 is repeated so many times that it will be as long as the data part 102. The preamble 100 is transmitted preferably on a Q channel of I/Q modulation, and the data part 102 is transmitted on an I channel.

Figure 2A:
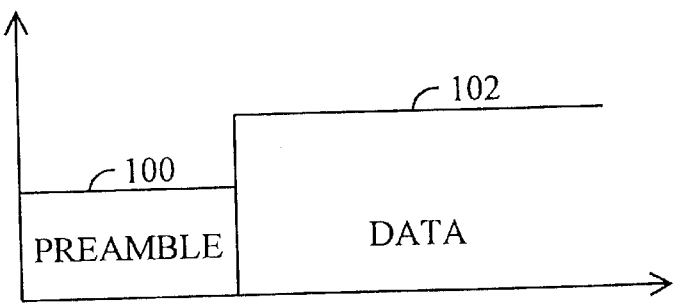
FIG. 2a shows transmission of a random access burst.
Figure 2B:
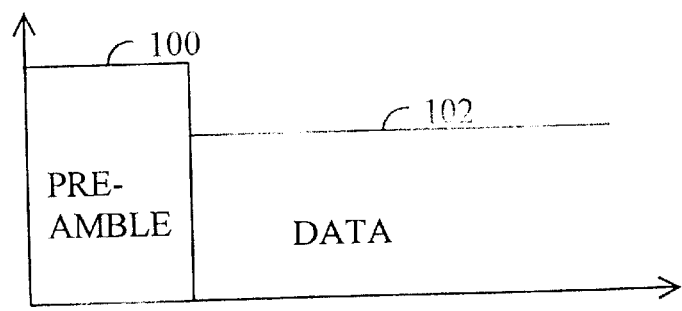
FIG. 2b shows transmission of a random access burst

FIG. 2a shows a situation where the spreading factor of the preamble 100 is greater than the spreading factor of the data part 102. The horizontal axis denotes time T and the vertical axis denotes power P. The data part 102 is transmitted with a greater power than the preamble 100. A longer spreading code or a greater spreading factor is less susceptible to interference, which means that the transmission power can be reduced. A longer spreading code possibly also has a longer duration. FIG. 2b in turn shows a situation where the preamble 100 is transmitted at a higher power than the data part 102 in order to further expedite the synchronization. Also in this case, the horizontal axis denotes time T and the vertical axis denotes power P. The spreading factor of the preamble 100 may be of a different length than the spreading code of the data part 102. In the arrangement according to the invention, the terminal equipment may also change the telecommunication rate by altering the spreading code of the data part 102. The telecommunication rate changes when the length of the spreading code is altered but the chip frequency remains constant. Another alternative manner of changing the telecommunication rate is to change the chip frequency but to keep the length of the spreading code unaltered. Naturally, it is also possible to change both the chip frequency and the length of the spreading code.

Figure 3A:
FIG. 3a shows transmission of a random access signal on a common channel.
Figure 3B:
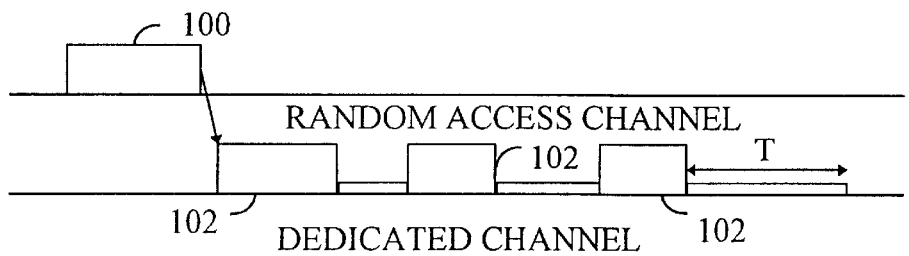
FIG. 3b shows transmission of a random access signal on a common and on a dedicated channel.

FIG. 3a shows a situation where communication between a terminal equipment and a base station takes place entirely on a random access channel that is common to several terminal equipments. The use of the random access channel alone is possible when the amount of the data to be transmitted is small and/or data packets are transmitted at long intervals. If there is a great deal of data and/or the data must be transmitted at a high packet rate, the radio system allocates a dedicated channel to a terminal equipment for data transmission, as shown in FIG. 3b. The dedicated channel is reserved for the communication of the particular terminal equipment as long as data packets or data parts 102 arrive at the channel within a period that is shorter than the channel release time $T_r$. If no packet is transmitted during the release time $T_r$, the dedicated channel will no longer be reserved but it becomes available for use by other terminal equipments.

Figure 4:
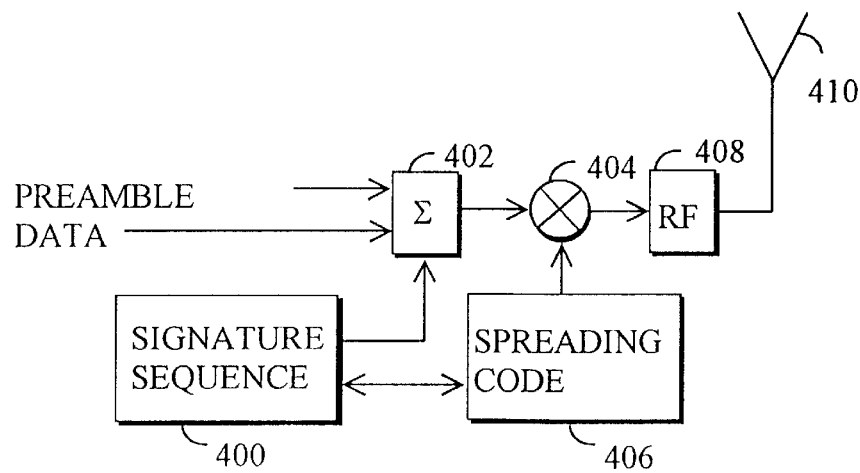
FIG. 4 is a block diagram of a terminal equipment transmitter.

FIG. 4 is a block diagram of a terminal equipment. The terminal equipment comprises signature sequence means 400, an inserting means 402, a multiplier 404, spreading code means 406, radio-frequency means 408 and an antenna 410. The signature sequence means 400 either generate the desired signature sequences or the signature sequences are already stored in the signature sequence means 400. Similarly, the spreading code means 406 either generate the desired spreading codes or the spreading codes are already stored in the spreading code means 406. The terminal equipment selects with a random process the spreading code by which the data part is multiplied before transmission by the terminal equipment. Since one signature sequence corresponds to one spreading code of the spreading code means 406, the inserting means 402 of the terminal equipment inserts into the preamble, at a symbol level, a signature sequence corresponding to the spreading code used for multiplying the data part. Consequently, the base station is informed of the spreading code of the data part by means of the signature sequence. The multiplier 404 multiplies the preamble and the data part by the spreading codes supplied from the spreading code means 406. The signals to be transmitted propagate from the multiplier 404 to the radio-frequency means 408, where the signal is converted into a radio-frequency signal and then transmitted via the antenna 410 to the base station. In this arrangement, the spreading code of the preamble is previously known in order that the base station can detect the data contained therein.

Figure 5:
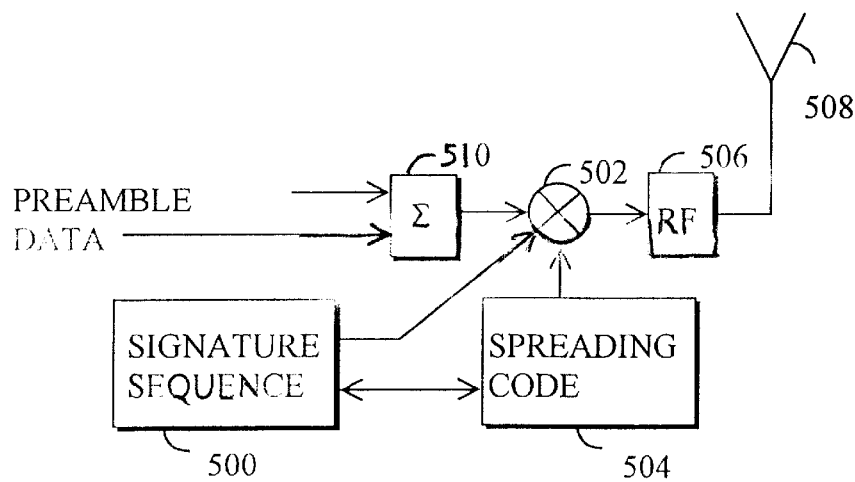
FIG. 5 is a block diagram of a terminal equipment transmitter.

FIG. 5 is a block diagram of a terminal equipment according to another embodiment of the invention. The terminal equipment comprises a bank of signature sequences 500, a multiplier 502, a bank of spreading codes 504, radio-frequency means 506, an antenna 508 and an inserting means 510. In this arrangement too, the terminal equipment selects randomly the spreading code by which the data part is multiplied before transmission. The preamble to be transmitted is multiplied in the multiplier 502 by a signature sequence spreading code that is selected from the signature sequence means 500 and that determines the spreading code used as the spreading code of the preamble from the spreading code means 504.

The spreading-coded signals transmitted by the terminal equipments form together a combined signal that is received by the base station. In the arrangement according to the invention, the base station forms a reference signal corresponding to each interference on the basis of the estimated channel impulse response and the detected interfering signal, as in the prior art methods. The base station thereafter eliminates at least the interference caused by the data part of the packet switched signal from the other signals, which may include both packet switched and circuit switched signals. It is thus possible to send packet switched transmissions at a higher power than in the prior art methods, which means that synchronization can also be achieved faster. Even though the interference cancellation methods are known per se, they are not used to facilitate synchronization in the manner disclosed above in the prior art arrangements.

A receiver commonly used in CDMA systems is a rake receiver consisting of one or several rake branches. Each branch is an independent receiver unit the function of which is to compose and demodulate one received signal component. Each rake branch can be synchronized with a signal component that has propagated along an individual path, and in a conventional CDMA receiver the signals from the receiver branches are combined advantageously to provide a signal of good quality. When a base station comprises rake branches, it is arranged to tune the rake receiver branches specifically to each terminal equipment by means of the signature sequence.

Interference cancellation is naturally limited at each base station. Therefore, the arrangement according to the invention is also provided with a property that a base station forwards data about its interference cancellation capacity to a terminal equipment. The terminal equipment in turn determines the transmission power of the random access signal it is transmitting according to the interference cancellation capacity of the base station. In other words, the terminal equipment keeps its transmission power low enough so that the interference in the radio system could be controlled. The base station typically transmits data about the total interference level of the signals it has received on a broadcast control channel (BCCH). When the base station performs interference cancellation on the random access signals, the base station indicates on the BCCH a total interference level of the received signals that is higher than the real interference level in order that the terminal equipment would increase the power of the packet switched random access signal. In this manner, detection can be improved and synchronization can be achieved more rapidly.

Another feature of the arrangement according to the invention is that the base station forwards the data about its interference cancellation capacity in some other manner, for example in a separate message. The base stations that do not employ interference cancellation may then indicate their lack of interference cancellation capacity for example by giving zero as their interference cancellation capacity or by not transmitting such a message.

Figure 6:
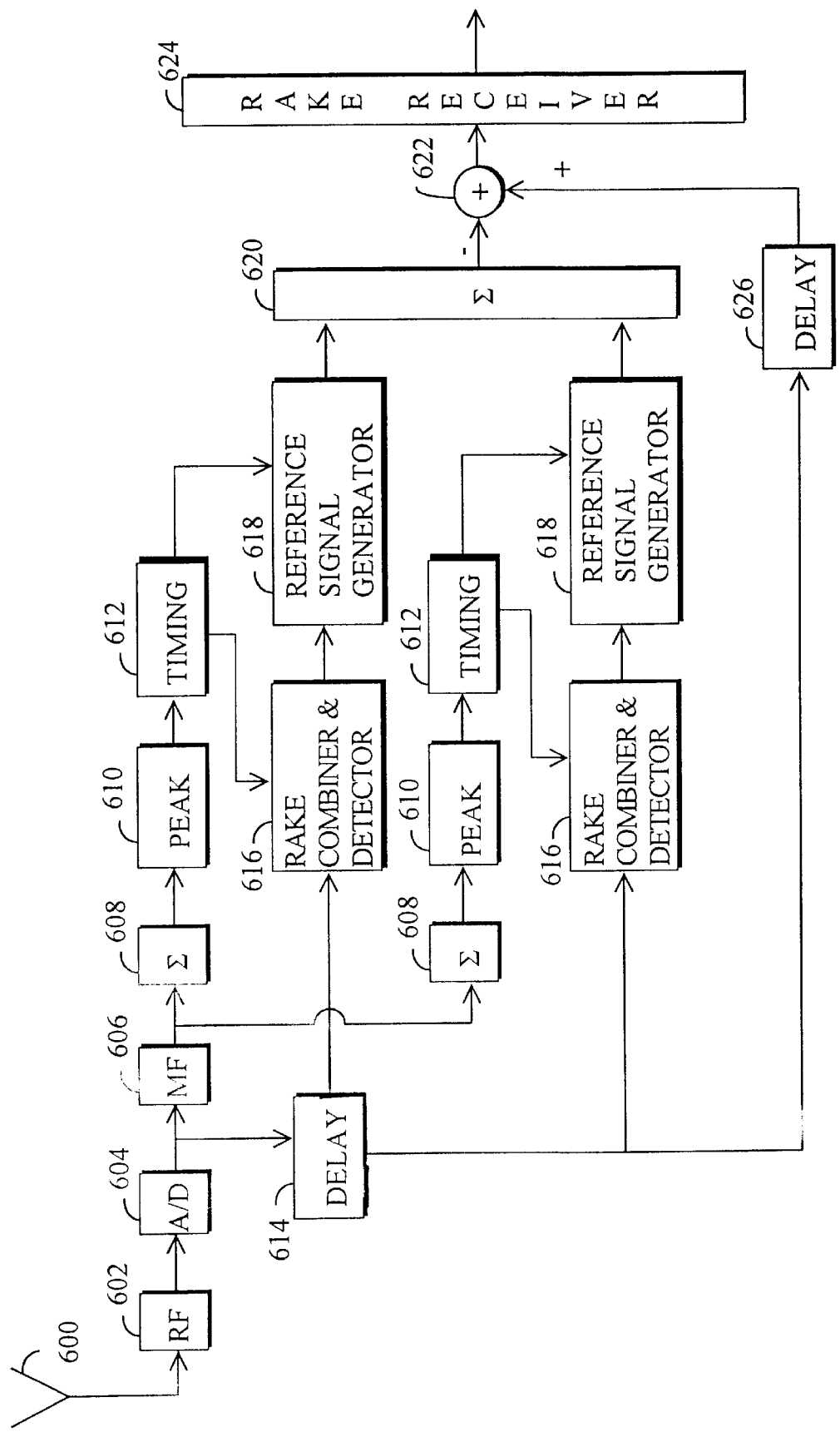
FIG. 6 is a block diagram of a base station receiver.

FIG. 6 is a block diagram of a base station receiver. The receiver operates in the following manner. A received signal propagates from an antenna 600 first to radio-frequency means 602, where the signal frequency is converted in a known manner from a radio frequency into a baseband or an intermediate frequency. This signal is converted into a digital signal in an AND converter 604. The digital signal is correlated in a known manner with the spreading code of the preamble of the random access signal in a matched filter 606, which forms an impulse response estimate for the radio channel. This impulse response estimate is filtered coherently in an adder 608, which sums up the samples of the output signal of the matched filter 606 one by one during the preamble. A desired number of symbols can be taken into account in the summing. Since each preamble comprises a signature sequence, the number of the adders needed for the summing equals the number of the signature sequences. The output of the matched filter is also correlated in the adder 608 with a symbol-level signature sequence. The adder that utilizes a signature sequence corresponding to the symbol-level signature sequence added to the preamble provides the greatest output signal. This output signal of the adder, which is also the averaged channel impulse response estimate, propagates to a peak detector 610. The peak detector 610 further controls a timing estimator 612 when the output signal of the adder 608 exceeds a predetermined threshold value. By means of peaks of the impulse response estimate, the timing estimator 612 tunes a rake combiner 616, which also comprises a detector, to the strongest multipath components of the signal in a known manner. The rake branches utilize the spreading code and the spreading factor indicated by the signature sequence. A delay line 614 delays a signal arriving at the rake combiner 616 by a delay caused by the means 606 to 612.

In addition to the timing estimates, the output signal of the adder 608 also provides estimates for the amplitudes and phases (channel estimates) of the multipath-propagated signal components, used for assembling the multipath-propagated random access signal in the rake combiner in a known manner. The detector provided in connection with the rake combiner makes a symbol decision based on the signal arriving from the rake combiner.

By means of the signal obtained from the rake combiner and the detector 616, a reference signal generator 618 generates a reference signal. The reference signal is formed for example in the following manner. The channel estimate of the multipath-propagated signal component is multiplied by a symbol estimate obtained from the detector 616. The result is further multiplied by a spreading code corresponding to the random access signal to form a broadband signal corresponding to the received multipath-propagated signal. At least the reference signal of the strongest broadband signals is formed and summed up in an adder 620. The summed result is subtracted in an adder 622 from the received combined signal that was delayed in a delay line 626. In this manner, the interference of the combined signal can be reduced and detection can be improved in a rake receiver 624 used for receiving signals from other packet and circuit switched connections. The delay line 626 delays the received signal further after the delay line 614, taking into account the delay caused by the means 616 to 620 in the signal processing. The delay line 614 is not needed for eliminating the interference caused by the data part of the random access signals, or the delay may be very short. On the other hand, if the interference caused by the packet preambles is also to be eliminated, the delay line 614 must be able to store signal samples in an amount corresponding to the preamble. The delay line 614 is also needed if the preamble is transmitted simultaneously with the data part but multiplied by a different spreading code.

Figure 7:
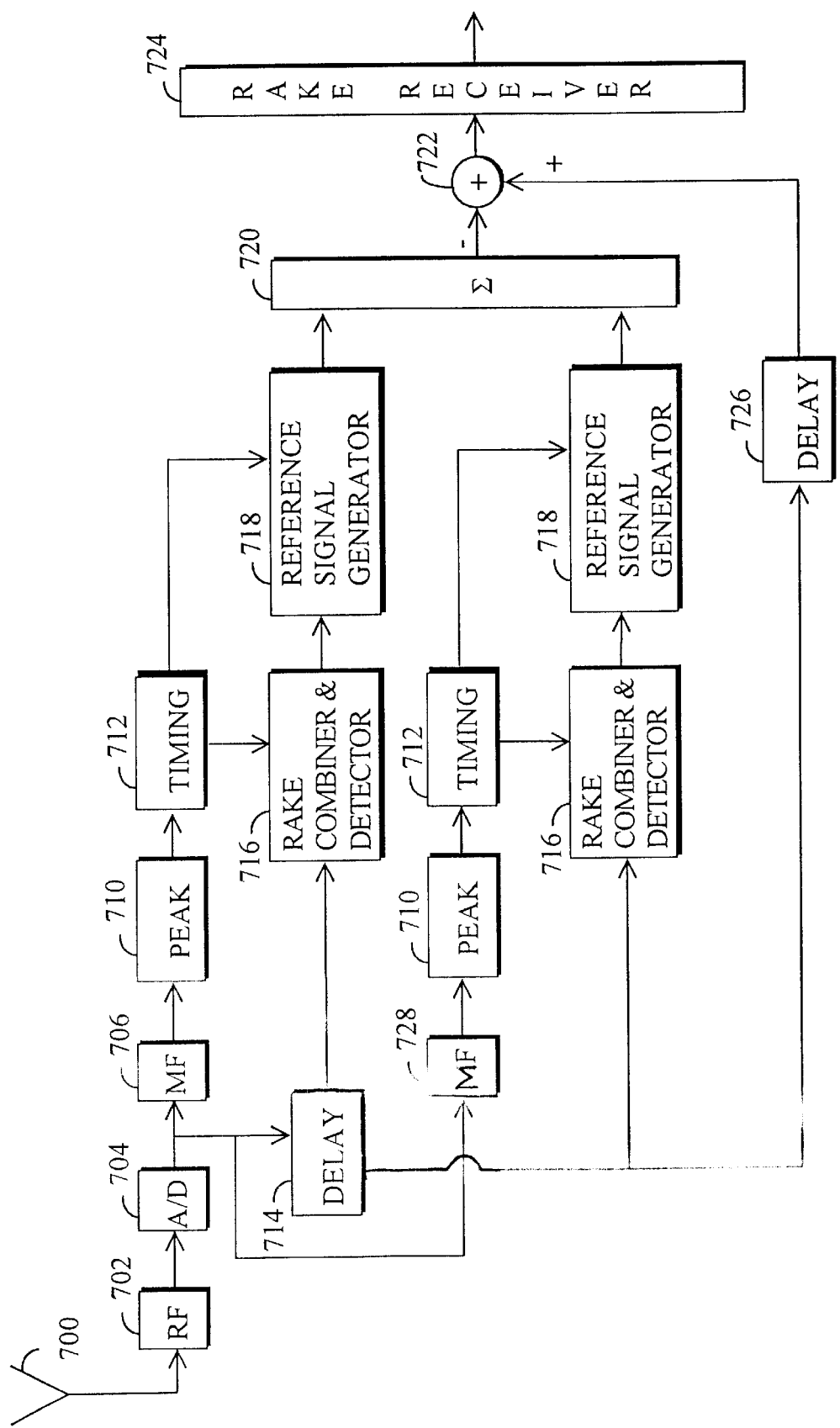
FIG. 7 is a block diagram of a base station receiver.

FIG. 7 shows a very similar receiver arrangement as FIG. 6. The reference numerals in FIGS. 6 and 7 refer to like parts, expect that FIG. 7 contains a new reference 100. One difference is a matched filter 728 that is needed when the signature sequence is the same as the spreading code. Another difference is that the adder blocks 608 shown in FIG. 6 and intended for the signature sequences are no longer needed.

The block diagram of FIG. 6 is only a simplified example of actual interference cancellation. The invention is not restricted to any particular interference cancellation method (s). In practice, interference cancellation would also concern other random access signals, and several stages of interference cancellation would be used. Also, the timing estimator 612 is not intended to tune only a certain physical rake combiner, since in such a case the rake allocation might be confused by a packet which arrives later with the same signature sequence and the preamble of which is received simultaneously with the data part of the previous packet.

Correlation $C(\tau)$ is formed mathematically for example in the following manner for functions $x(t)$ and $y(t)$:

$$C(t) = \int_a^b x(\tau)y(\tau+t)d\tau,$$

wherein a and b represent the calculation interval for correlation. Correlation matrix C is calculated digitally as a cross product for variable matrices X and Y in the following manner:

$$C(n) = \sum_{i=1}^{N} x(i)y(n+i),$$

wherein $C(n)$ corresponds to matrix C.

The arrangement according to the invention utilizes known bad burst detection methods, which include cyclic redundancy check CRC and the pseudober method. In the CRC method, a check parity is calculated for a bit block according to a known code polynome. This is compared with the parity bits calculated by the channel coder, and if the parity bits are the same, the received frame is error-free. Another example of identifying a bad burst is the pseudober method where a received burst is channel-coded again with a convolutional code after Viterbi decoding. The coded burst is compared directly with a burst received from the channel, and the differences in the bit sequences of the bursts indicate error corrections performed by the Viterbi decoder. A burst is determined to be bad if the Viterbi decoder has changed more bits than allowed by a predetermined limit. However, in the arrangement according to the invention the type of the interference cancellation method used is not significant, but the essential point is that the interference cancellation arrangement used is known in the field.

Even though the invention is described above with reference to an example according to the accompanying drawings, it is clear that the invention is not restricted thereto but it can be modified in several ways within the scope of the inventive idea disclosed in the appended claims.

What is claimed is:

1. A data transmission method used in a CDMA-type radio system comprising at least one base station and a plurality of terminal equipments that exchange data at least in a packet switched mode, wherein transmitting by a terminal equipment a random access signal to the base station on a random access channel, transmitting by a base station data about interference cancellation capacity of the base station to the terminal equipment, and the terminal equipment determines the transmission power of the random access signal it transmits using at least partially the signalled data on the interference cancellation capacity of the base station.

2. A method according to claim 1, wherein performing interference cancellation at the base station using the structure of the received random access signal, such that at least the interference caused by the random access signal is at least partly cancelled from at least one other received signal.

3. A radio system that is of the CDMA type and that comprises at least one base station and a plurality of terminal equipments which are arranged to exchange data at least in a packet switched mode, a terminal equipment being arranged to transmit to the base station a random access signal on a random access channel, wherein the base station is arranged to transmit data about its interference cancellation capacity to the terminal equipment, and the terminal equipment is arranged to determine the transmission power of the random access signal it transmits using at least partially the signalled data on the interference cancellation capacity of the base station.

4. A radio system according to claim 3, wherein the base station is arranged to perform interference cancellation using the structure of the received random access signal, such that the base station is arranged to cancel at least partly the interference caused by the random access signal from at least one other received signal in order to increase transmission capacity and to improve detection.

5. A radio system according to claim 4, wherein the terminal equipment comprises signature sequence means and spreading code means that are arranged to provide a predetermined set of spreading codes and signature sequences, each signature sequence determining one spreading code; wherein the terminal equipment is arranged to select one signature sequence by a random process from the set of signature sequences, and to add the selected signature sequence to the preamble of the random access signal;

the terminal equipment is arranged to use the spreading code corresponding to the selected signature sequence in the data part of the random access signal.

\* \* \* \* \*

UNITED STATES PATENT AND TRADEMARK OFFICE
CERTIFICATE OF CORRECTION

PATENT NO.     : 6,625,138 B2
DATED          : September 23, 2003
INVENTOR(S)    : Kärnä et al.

It is certified that error appears in the above-identified patent and that said Letters Patent is hereby corrected as shown below:

<u>Title page,</u>
Item [12], please amend follows:
-- [12] Kärnä et al. --

Signed and Sealed this

Tenth Day of February, 2004

JON W. DUDAS
*Acting Director of the United States Patent and Trademark Office*